United States Patent
Hwang et al.

(10) Patent No.: US 10,728,824 B2
(45) Date of Patent: Jul. 28, 2020

(54) METHOD AND APPARATUS FOR IMPROVING COVERAGE OF CELL IN WIRELESS COMMUNICATION SYSTEM

(71) Applicant: Samsung Electronics Co., Ltd., Suwon-si, Gyeonggi-do (KR)

(72) Inventors: Jiwon Hwang, Suwon-si (KR); Sungjin Lee, Bucheon-si (KR); Rayeon Ahn, Seoul (KR); Jungsoo Jung, Seongnam-si (KR)

(73) Assignee: Samsung Electonics Co., Ltd., Suwon-si (KR)

( * ) Notice: Subject to any disclaimer, the term of this patent is extended or adjusted under 35 U.S.C. 154(b) by 63 days.

(21) Appl. No.: 16/069,474

(22) PCT Filed: Jan. 11, 2017

(86) PCT No.: PCT/KR2017/000381
§ 371 (c)(1),
(2) Date: Jul. 11, 2018

(87) PCT Pub. No.: WO2017/123009
PCT Pub. Date: Jul. 20, 2017

(65) Prior Publication Data
US 2019/0045416 A1    Feb. 7, 2019

Related U.S. Application Data

(60) Provisional application No. 62/277,086, filed on Jan. 11, 2016.

(51) Int. Cl.
*H04W 36/30* (2009.01)
*H04W 36/36* (2009.01)
(Continued)

(52) U.S. Cl.
CPC ....... *H04W 36/30* (2013.01); *H04W 36/0061* (2013.01); *H04W 36/0088* (2013.01);
(Continued)

(58) Field of Classification Search
CPC ............. H04W 36/30; H04W 36/0061; H04W 36/0088; H04W 76/20; H04W 76/28;
(Continued)

(56) References Cited

U.S. PATENT DOCUMENTS

2007/0225051 A1* 9/2007 Nader ................. H04B 17/309
455/574
2007/0287476 A1* 12/2007 Jeong .................... H04W 76/10
455/456.6
(Continued)

FOREIGN PATENT DOCUMENTS

EP           2651048 A2    10/2013
KR    10-2014-0084111 A    7/2014
(Continued)

OTHER PUBLICATIONS

Communication pursuant to Article 94(3) EPC dated Jun. 25, 2019 in connection with European Patent Application No. 17 738 638.0, 12 pages.
(Continued)

*Primary Examiner* — Chi H Pham
*Assistant Examiner* — Weibin Huang

(57) ABSTRACT

The present disclosure relates to a communication technique for converging a 5G communication system for supporting a higher data rate beyond a 4G system with an IoT technology, and a system therefor. The present disclosure can be applied to an intelligent service (e.g., smart home, smart building, smart city, smart car or connected car, health care, digital education, retail, security and safety related service, and the like) on the basis of a 5G communication technology
(Continued)

and an IoT related technology. A method for a terminal according to the present invention comprises the steps of: receiving system information; receiving a signal from a service cell when a discontinuous reception (DRX) timer expires; determining the mobility of the terminal on the basis of the signal; and omitting neighboring cell measurement when the terminal has no mobility.

12 Claims, 10 Drawing Sheets

(51) Int. Cl.
*H04W 52/02* (2009.01)
*H04W 76/20* (2018.01)
*H04W 36/00* (2009.01)
*H04W 76/28* (2018.01)
*H04W 36/32* (2009.01)

(52) U.S. Cl.
CPC .......... *H04W 36/32* (2013.01); *H04W 36/36* (2013.01); *H04W 52/0216* (2013.01); *H04W 52/0229* (2013.01); *H04W 76/20* (2018.02); *H04W 76/28* (2018.02); *H04W 52/0245* (2013.01)

(58) Field of Classification Search
CPC . H04W 36/32; H04W 36/36; H04W 52/0216; H04W 52/0229
See application file for complete search history.

(56) References Cited

U.S. PATENT DOCUMENTS

| | | | |
|---|---|---|---|
| 2013/0045770 A1 | 2/2013 | Aschan et al. | |
| 2013/0188503 A1 | 7/2013 | Anepu et al. | |
| 2013/0250831 A1 | 9/2013 | Park et al. | |
| 2014/0092731 A1 | 4/2014 | Gupta | |
| 2014/0179303 A1* | 6/2014 | Kang | H04W 24/08 455/422.1 |
| 2014/0185475 A1* | 7/2014 | Ji | H04W 36/0088 370/252 |
| 2014/0200002 A1* | 7/2014 | Vangala | H04W 24/10 455/436 |
| 2014/0247765 A1 | 9/2014 | Baghel et al. | |
| 2014/0295820 A1* | 10/2014 | Kim | H04W 52/0216 455/418 |
| 2015/0304911 A1* | 10/2015 | Wang | H04W 36/0088 370/331 |
| 2016/0157120 A1 | 6/2016 | Shi et al. | |
| 2016/0198519 A1 | 7/2016 | Wang et al. | |
| 2017/0331611 A1* | 11/2017 | Stern-Berkowitz | H04L 1/1854 |
| 2018/0279408 A1* | 9/2018 | Jha | H04W 52/0216 |

FOREIGN PATENT DOCUMENTS

| | | |
|---|---|---|
| KR | 10-2015-0032747 A | 3/2015 |
| WO | 2015018136 A1 | 2/2015 |
| WO | 2015019180 A2 | 2/2015 |

OTHER PUBLICATIONS

Supplementary European Search Report dated Sep. 28, 2018 in connection with European Patent Application No. 17 73 8638, 11 pages.
Gemalto N.V., "MTC cell re-selection and mobility implications", 3GPP TSG-RAN WG2 Meeting #91bis, Oct. 5-9, 2015, R2-154183, 5 pages.
ISA/KR, International Search Report and Written Opinion of the International Searching Authority for International Application No. PCT/KR2017/000381, Apr. 4, 2017, 21 pages.
Ericsson, "Narrowband LTE—Random Access Design," R1-156011, 3GPP TSG-RAN1 #82bis, Malmo, Sweden, Oct. 5-9, 2015, 11 pages.
Samsung, "Narrowband IOT—Uplink Design," R1-155514, 3GPP TSG RAN WG1 Meeting #82bis, Malmo, Sweden, Oct. 5-9, 2015, 5 pages.

* cited by examiner

METHOD AND APPARATUS FOR IMPROVING COVERAGE OF CELL IN WIRELESS COMMUNICATION SYSTEM

CROSS-REFERENCE TO RELATED APPLICATIONS AND CLAIM OF PRIORITY

This application is a 371 National Stage of International Application No. PCT/KR2017/000381 filed Jan. 11, 2017, which claims the benefit of U.S. Provisional Application No. 62/277,086 filed Jan. 11, 2016, the disclosures of which are herein incorporated by reference in their entirety.

1. FIELD

The present invention relates to a wireless communication system and, more particularly, to a method and apparatus for improving cell coverage.

2. DESCRIPTION OF RELATED ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Meanwhile, a low-power terminal needs to operate efficiently for a long-time operation without a change of battery. In order to reduce power consumption, the terminal may perform a discontinuous reception (DRX) operation. If the terminal is in a radio resource control (RRC) connected state from an idle state periodically, the terminal may measure a synchronization signal or a reference signal and then perform a cell reselection when the strength of the signal is smaller than a threshold value.

However, in case of a low-power terminal without mobility, even though a serving cell is the optimal cell (hereinafter, best cell) having the highest signal strength or quality, the terminal may perform an unnecessary cell reselection because the signal strength does not exceed the threshold value.

Accordingly, there is a need for a method of setting a cell reselection criterion capable of supporting coverage expansion of a cell so as not to perform an unnecessary neighbor cell measurement operation.

SUMMARY

It is an object of the present invention to provide a method and apparatus for setting a cell reselection criterion capable of supporting coverage expansion of a cell so as not to perform an unnecessary neighbor cell measurement operation.

According to the present invention, a method of a terminal comprises receiving system information, receiving a signal from a serving cell when a discontinuous reception (DRX) timer expires, determining mobility of the terminal, based on the signal, and skipping neighbor cell measurement when the terminal has no mobility.

In addition, according to the present invention, a terminal comprises a transceiver transmitting and receiving signals, and a controller receiving system information, receiving a signal from a serving cell when a discontinuous reception (DRX) timer expires, determining mobility of the terminal, based on the signal, and skipping neighbor cell measurement when the terminal has no mobility.

According to the present invention, by not performing an unnecessary cell reselection operation, the coverage of a cell can be expanded, and the battery efficiency of a terminal can be increased.

DETAILED DESCRIPTION

Figure 1:
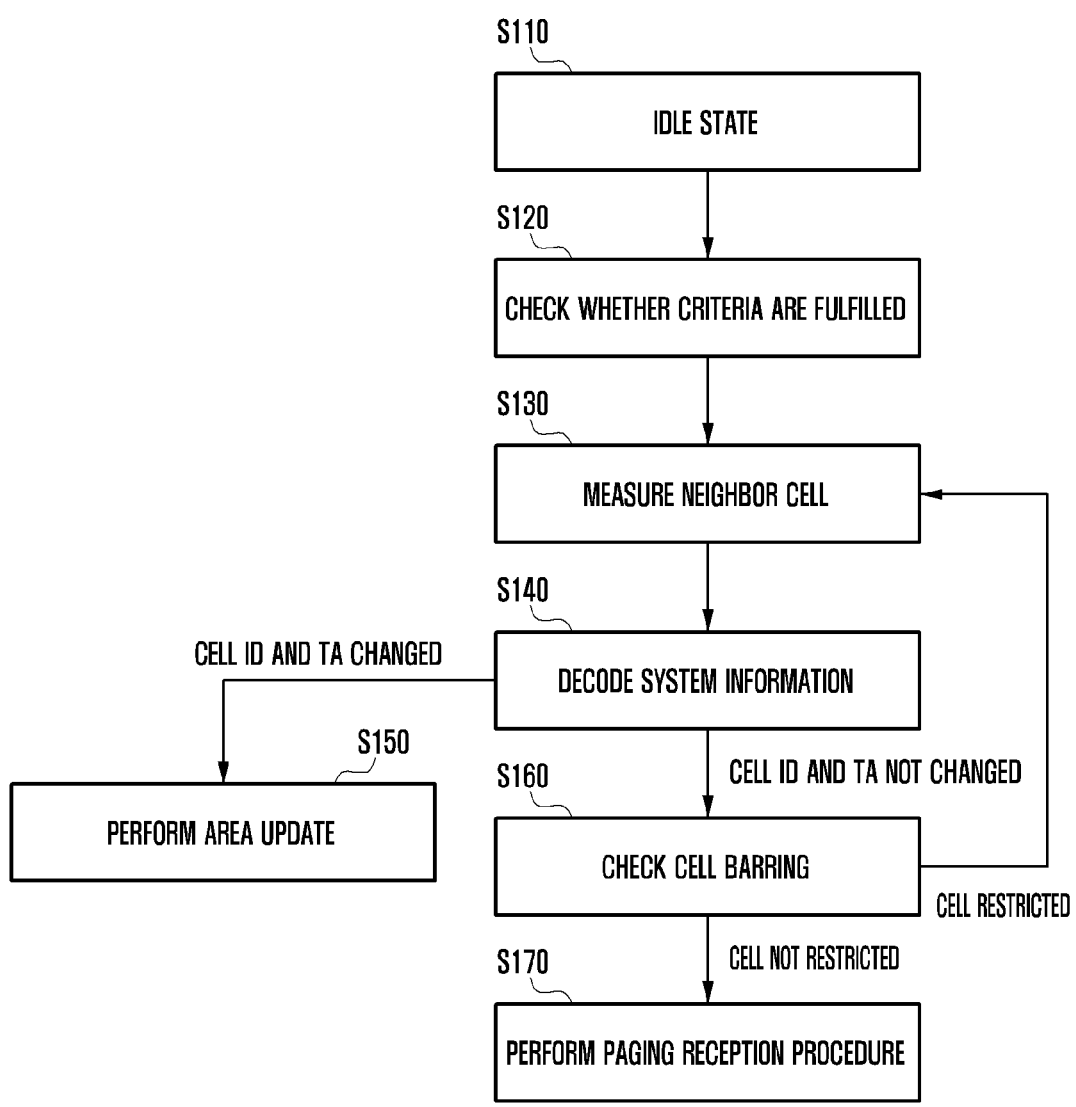
FIG. 1 is a diagram illustrating a cell reselection process of a terminal.

Hereinafter, embodiments of the present invention will be described in detail with reference to the accompanying drawings.

In the following description of embodiments, descriptions of techniques that are well known in the art and not directly related to the present invention are skipped. This is to clearly convey the subject matter of the present invention by skipping an unnecessary explanation.

For the same reason, some elements in the drawings are exaggerated, skipped, or schematically illustrated. Also, the size of each element does not entirely reflect the actual size. In the drawings, the same or corresponding elements are denoted by the same reference numerals.

The advantages and features of the present invention and the manner of achieving them will become apparent with reference to embodiments described in detail below with reference to the accompanying drawings. The present invention may, however, be embodied in many different forms and should not be construed as limited to embodiments set forth herein. Rather, these embodiments are provided so that this disclosure will be thorough and complete, and will fully convey the scope of the invention to those skilled in the art. To fully disclose the scope of the invention to those skilled in the art, and the invention is only defined by the scope of claims.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and modules. In addition, the components and units may be implemented to operate one or more central processing units (CPUs) in a device or a secure multimedia card.

In the drawings that illustrate a method according to an embodiment, the order of description does not necessarily correspond to the order of execution, and the order of execution may be changed or a parallel execution is possible.

In addition, although the present invention will be described using a wireless communication system as an example for convenience of description, the present invention is also applicable to a wired communication system.

The present invention is a technology related to an idle mode operation of a long-distance Internet-of-things (IoT) terminal (or referred to as UE) among low throughput discussed in 3GPP and other wireless network technology standards. These technologies define energy-efficient operations to achieve the aim that each terminal can run for a long time without battery replacement. For this, a coverage class (or a coverage level, a coverage enhancement level, etc.) is defined, based on a quantized value of a path-loss from a base station to a terminal. The use of a resource allocation scheme predefined based on this value can simplify a resource management as a whole.

The technology proposed by the present invention relates to an efficient idle mode operation based on the coverage class and to a related method.

In addition, the technology proposed by the present invention relates to a method for performing a cell reselection by considering mobility or the like of a terminal in order to minimize battery consumption of a plurality of terminals even when the coverage class is not classified.

FIG. 1 is a diagram illustrating a cell reselection process of a terminal.

Referring to FIG. 1, the terminal may perform a DRX operation, and thus periodically operate in an idle state or an RRC connected state. The terminal may perform the DRX operation according to a DRX timer received from a base station.

The terminal may operate in the idle state at step S110. In addition, when the DRX timer expires, the terminal may transition to the RRC connected state.

At step S120, the terminal may identify whether a criteria condition is fulfilled. A case where the criteria condition is fulfilled may mean that the strength or quality of a signal received from a serving cell is greater than a threshold value.

Specifically, the terminal may receive a synchronization signal (e.g., a primary synchronization signal (PSS), a secondary synchronization signal (SSS)) or a reference signal (e.g., a cell-specific reference signal (CRS)) and measure the strength and quality of the signal. Also, the terminal may measure the signal strength and quality of a neighbor cell.

Then, the terminal may compare the strength or quality of the signal with the threshold value and identify whether the criteria condition is fulfilled. The terminal may previously receive the threshold value via system information.

When the signal strength or quality exceeds the threshold value, the terminal may decode the system information at step S140. However, this step may be selectively performed as needed.

By decoding the system information, the terminal may identify whether a cell identifier (ID) and a tracking area (TA) code are changed.

If the cell ID and the TA code are changed, the terminal may perform an area update at step S150. The area update may include a tracking area update (TAU) and a cell reselection.

Then, the terminal may perform a paging reception procedure at step S170.

However, if the cell ID and the TA code are not changed, the terminal may identify cell barring at step S160.

If the corresponding cell is not restricted, the terminal may perform the paging reception procedure at step S170.

However, if the corresponding cell is restricted, the terminal may trigger a cell reselection procedure at step S130. Therefore, the terminal may determine, as a serving cell candidate, a cell having the greatest signal strength among cells excluding the restricted cell. Then, the terminal may receive the system information, identify the cell ID and the TA at step S140, and identify the cell barring. The details are the same as described above.

Meanwhile, if it is determined at step S120 that the criteria condition is not fulfilled, the terminal may measure a neighbor cell at step S130. The terminal may measure the strength of a signal received from the neighbor cell and determine, as a candidate for a new serving cell, a cell having the greatest signal strength among neighbor cells.

Then, the terminal may receive and decode system information at step S140, identify whether a cell 1D and a TA are changed, and identify whether a cell is restricted.

In addition, an operation for inter-frequency cell reselection may be performed after the terminal determines whether the criteria condition is fulfilled.

That is, a scheme of triggering an intra-frequency cell reselection or an inter-frequency cell reselection based on the current criteria condition is to measure the signal strength based on a synchronization signal or a reference signal received from a serving cell, compare it with a predefined threshold value, and trigger a neighbor cell measurement operation.

Figure 2:
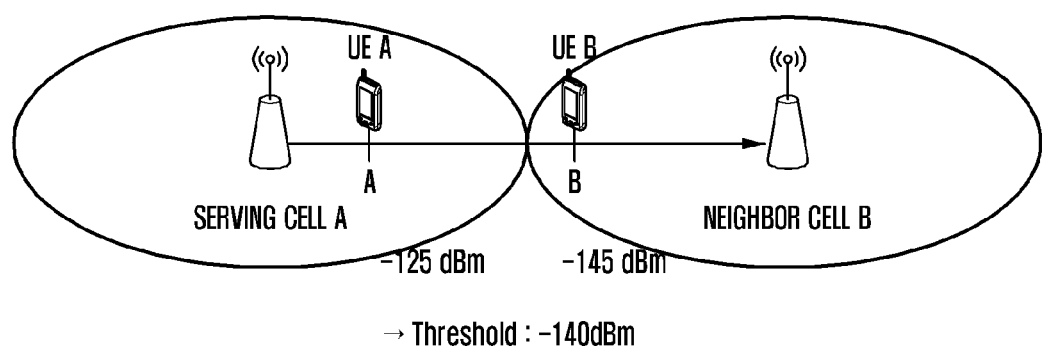
FIG. 2 is a diagram illustrating a criteria condition for a cell reselection of a terminal.

FIG. 2 is a diagram illustrating a criteria condition for a cell reselection of a terminal (i.e., UE).

Referring to FIG. 2, a serving cell of UE A and UE B may be a cell A. Therefore, in the RRC connected state, each UE may receive a signal from the serving cell.

In this case, a threshold value for fulfilling a criteria condition may be −140 dB. The strength of a signal received from the serving cell by the UE A may be measured as −125 dB, which is greater than the threshold value. Therefore, the UE A may not perform the cell reselection.

However, the strength of a signal received from the serving cell by the UE B may be measured as −145 dB, which is smaller than the threshold value. Therefore, the UE B may perform the cell reselection.

As seen from FIG. 2, because the UE B is in the coverage of a neighbor cell, the UE may select a cell B by measuring a signal received from the neighbor cell.

Figure 3:
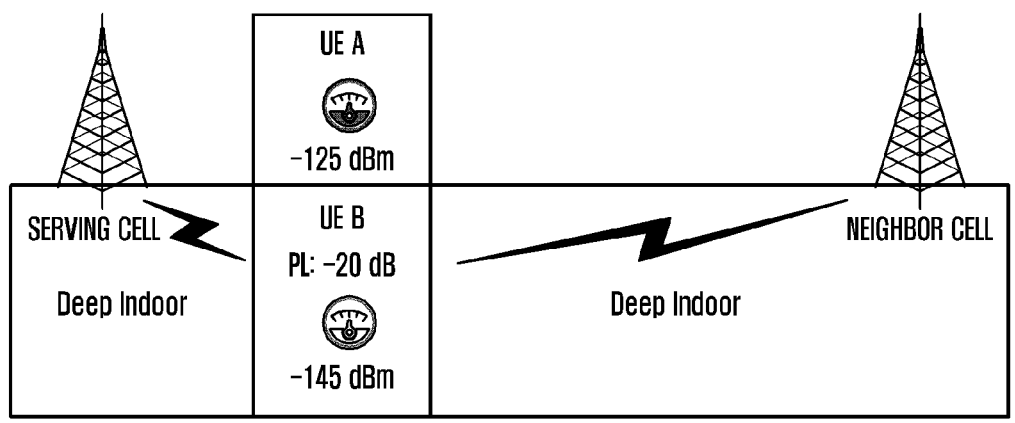
FIG. 3 is a diagram illustrating a problem in a cell reselection process.

FIG. 3 is a diagram illustrating a problem in a cell reselection process.

Referring to FIG. 3, in case of UE having no mobility, a problem may arise. The UE may measure a signal received from a serving cell, compare it with a threshold value provided by the serving cell, and thereby determine whether to perform a cell reselection. If the strength or quality of the signal received from the serving cell is smaller than the threshold value, the UE may perform the cell reselection. In case of stationary UE, the signal strength or quality may be smaller than the threshold value when a channel state is temporarily deteriorated. However, even in this case, the serving cell may be the optimal cell having the greatest signal strength.

For example, in FIG. 3, the UE A calculates a path loss (or coupling loss), based on the signal strength measured from the serving cell. This value is 125 dB, and the threshold value is 140 dB. Because the path loss is smaller than the threshold value, the UE A may not perform the cell reselection. That is, because a small path loss means that the strength of a signal is large, the UE may not perform the cell reselection.

In case of the UE B, the value of a path loss (or coupling loss) calculated based on the signal strength measured from the serving cell is 145 dB, and the threshold value is 140 dB. Therefore, the path loss is greater than the threshold value. That is, because a large path loss means that the strength of a signal is small, the UE may perform the cell reselection.

However, even in this case, the serving cell may be the optimal cell having the greatest signal strength. In addition, although the UE B is shown as being located in a deep indoor place, the same problem may also occur in case of stationary UE located on the ground.

As described hereinbefore, even if the serving cell is the optimal cell, the neighbor cell measurement may be performed unnecessarily because the criteria condition is not fulfilled. Therefore, a method for designing criteria capable of supporting coverage expansion of a cell is needed so as not to perform unnecessary neighbor cell measurement.

Figure 4:
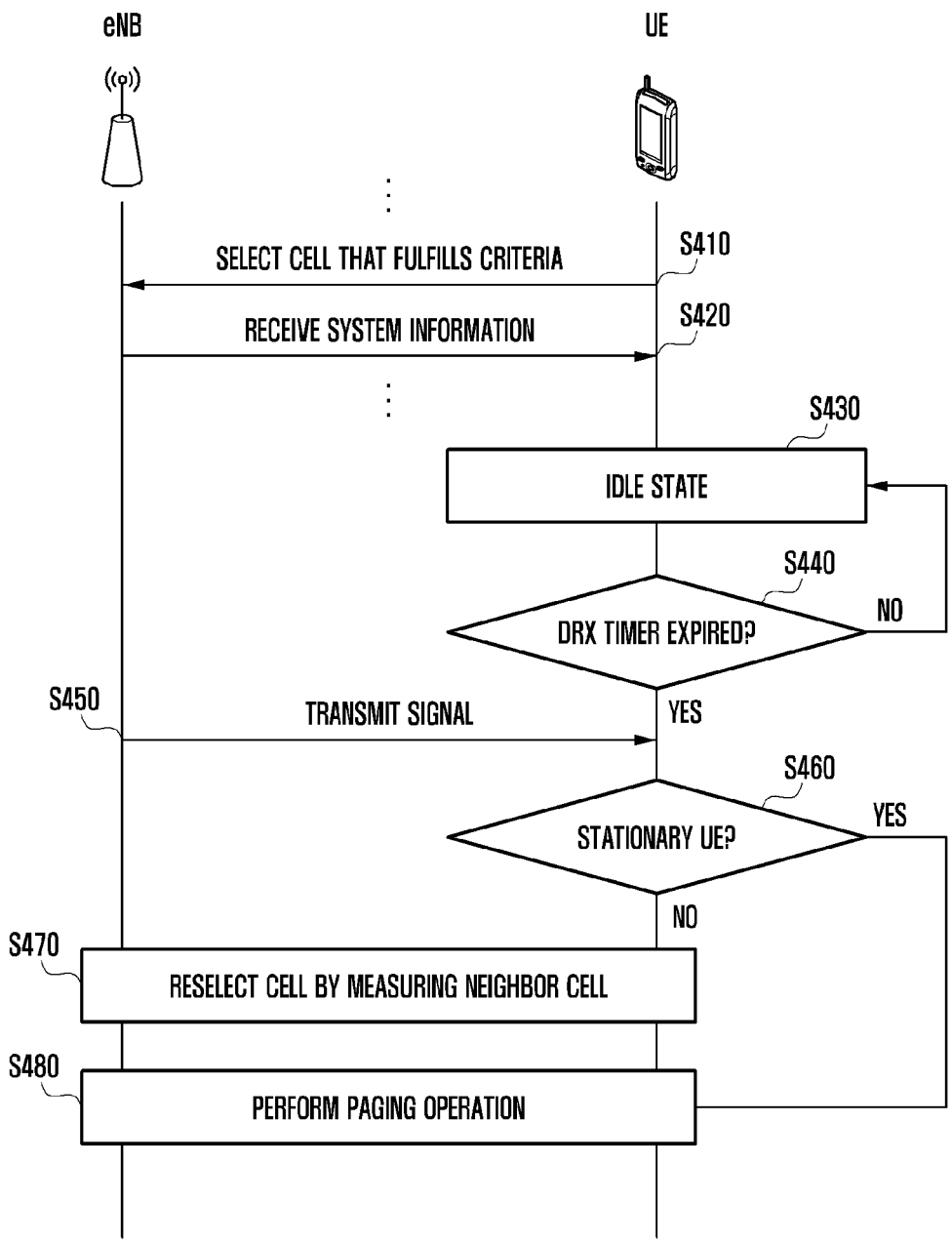
FIG. 4 is a diagram illustrating a method for expanding cell coverage according to an embodiment of the present invention.

FIG. 4 is a diagram illustrating a method for expanding cell coverage according to an embodiment of the present invention.

Referring to FIG. 4, at step S410, UE may select a cell that fulfills a criteria condition. At this time, the UE may store a value measured in this cell.

The stored value may include, for example, at least one of a cell selection RX level value (Srxlev), a cell selection quality value (Squal), a measured cell RX level value (Qrxlev or RSRP), and a measured cell quality value (Qqual or RSRQ).

Then, at step S420, the UE may receive system information. The system information may include a master information block (MIB) and a system information block (SIB).

The system information may include information for a cell selection or information for a cell reselection.

The information for a cell selection or the information for a cell reselection may include information about at least one of a timer value (Tpause), a signal strength change threshold (ChangeThreshold-rxlev), and an observation interval (Tobservation). This information may be included in SIB 3, for example.

Alternatively, this information may be included in an RRC message or the like instead of the system information.

Then, the UE may perform a DRX operation. Thus, the UE may periodically transition between an idle state and an RRC connected state. When a DRX timer expires, the UE may transition to the RRC connected state.

The UE may operate in the idle state at step S430 and identify at step S440 whether the DRX timer expires.

If the DRX timer expires, the UE may receive a signal from a serving cell at step S450. As described above, this signal received by the UE may include at least one of a synchronization signal and a reference signal. Therefore, the UE may determine the strength and quality of a cell signal by measuring the signal received from the serving cell.

Then, at step S460, the UE may determine the mobility of the UE.

If it is determine that the UE moves, the UE may determine whether the strength of the received signal fulfills the criteria condition. If it fails to fulfill, the UE may measure a neighbor cell and thereby perform a cell reselection at step S470.

If it is determined that the UE does not move (or that the UE is stationary), the UE may omit the measurement of a neighboring cell. Even when the received signal strength fails to fulfill the criteria condition, the UE may omit the neighbor cell measurement. The UE may omit the neighbor cell measurement operation once or a certain number of times. Also, the UE may omit the neighbor cell measurement operation for a predetermined timer or increase the period of the neighboring cell measurement.

In addition, if it is determined that the UE does not move even in the next RRC connected state, the UE may gradually increase the neighbor cell measurement period.

Then, at step S480, the UE may perform a paging operation.

Meanwhile, the present invention may use various methods for determining the mobility of UE and also, in case of stationary UE, use various methods for skipping the measurement of a neighbor cell. Hereinafter, methods for determining the UE mobility and methods for skipping the neighbor cell measurement in case of stationary UE will be described in detail.

<First Method>

The UE may adjust a measurement period according to a change amount of recently measured values of a serving cell.

The UE may determine whether the change amount of measured values of a signal is greater than a threshold value. In this case, the measured value of a signal may include at least one of the strength value or quality value of a received signal. In addition, the above terms may be equally applied in the following.

Specifically, when a difference between the strength or quality value (Srxlev and/or Squal) of a received signal and the last measured value (or previously measured value) is smaller than each of a signal strength change threshold (ChangeThreshold-rxlev) and a signal quality change threshold (ChangeThreshold-qual), the UE may determine that there is no mobility. Alternatively, when a difference between the strength value of the received signal and the previously measured signal strength value is smaller than the signal strength change threshold, or when a difference between the quality value of the received signal and the previously measured signal quality value is smaller than the signal quality change threshold, the UE may determine that there is no mobility.

As described above, the UE may store the measured signal strength or quality value, and compare a measured value in the next RRC connected state with the previously measured value to determine whether the threshold value is exceeded. In this case, the threshold value may be received through system information as described above, for example, through SIB For example, the system information may be configured as follows.

TABLE 1

| SystemInformationBlockType3 ::= | SEQUENCE { |
| --- | --- |
| ... (Omitted) | |
| Tpause | Tpause |
| ChangeThreshold-rxlev | ChangeThreshold-rxlev |

TABLE 1-continued

| ChangeThreshold-qual | ChangeThresshold-qual |
| --- | --- |
| } | |
| ... | |

However, as described above, the above information may be transmitted to the UE through the RRC message.

Therefore, if it is determined that the UE has no mobility, the UE may not perform measurement of a neighbor cell by a timer value.

This may be expressed as follows.

TABLE 2

The measurement operation of the UE and the number of times thereof may be restricted by the following conditions.
When the current serving cell fulfills the following conditions, the UE may restrict the neighbor cell measurement operation during a period of Tpause.
Srxlev > 0 and Squal > 0
When 'latest Srxlev - the last Srxlev' < ChangeThreshold-rxlev and 'latest Squal - the last Squal' < ChangeThreshold-qual,
(Following rules are used by the UE to limit needed measurements:
If the serving cell fulfils Srxlev > 0 and Squal > 0 and the absolute value of 'latest Srxlev - the last evaluated Srxlev' < ChangeThreshold-rxlev and 'latest Squal - the last evaluated Squal' < ChangeThreshold-qual, the UE may choose not to perform neighbour cell measurements for Tpause-)

However, the present invention is not limited to the above. If it is determined that there is no mobility, the UE may use a method of omitting the neighbor cell measurement for a certain number of times or increasing the measurement period of a neighbor cell. In addition, if it is determined that the UE does not move even in the next RRC connected state, the UE may gradually increase the measurement period of a neighbor cell.

In this case, information for changing the neighbor cell measurement may be received through the system information.

<Second Method>

The UE may adjust the measurement period when a measured value of a serving cell signal is not changed for a certain time.

The UE may determine whether a change amount of at least one of a signal strength or quality value is greater than a threshold value during an observation interval.

Specifically, when a difference between the strength or quality value (Srxlev and/or Squal) of a signal received during the observation interval and the last measured value (or previously measured value) is smaller than each of a signal strength change threshold (ChangeThreshold-rxlev) and a signal quality change threshold (ChangeThreshold-qual), the UE may determine that there is no mobility. Alternatively, when a difference between the strength value of the signal received during the observation interval and the previously measured signal strength value is smaller than the signal strength change threshold, or when a difference between the quality value of the signal received during the observation interval and the previously measured signal quality value is smaller than the signal quality change threshold, the UE may determine that there is no mobility.

In this case, when a signal strength change or signal quality change is continuously smaller than the threshold value during the observation interval, the UE may determine that there is no mobility. Alternatively, when the signal strength change or signal quality change is smaller than the threshold value more than a certain number of times during the observation interval, the UE may determine that there is no mobility.

The UE may store the measured signal strength or quality value as described above. Also, the UE may compare a measured value in the next RRC connected state with the previously measured value and thereby determine whether the threshold value is exceeded. The threshold value, the observation interval, and the like may be received through the system information as described above, for example, through SIB 3.

For example, the system information may be configured as follows.

TABLE 3

| SystemInformationBlockType3 ::= | SEQUENCE { | |
|---|---|---|
| ... (Omitted) | | |
| Tobservation | Tobservation | OPTIONAL |
| Tpause | Tpause | OPTIONAL |
| ChangeThreshold-rxlev | ChangeThreshold-rxlev | OPTIONAL |
| ChangaThreshold-qual | ChangeThreshold-qual | OPTIONAL |
| } | | |
| ... | | |

However, as described above, the information may be transmitted to the terminal through the RRC message.

Therefore, if it is determined that the UE has no mobility, the UE may not perform measurement of a neighbor cell by a timer value. Alternatively, the UE may use a method of omitting the neighbor cell measurement for a certain number of times or increasing the measurement period of a neighbor cell. In addition, if it is determined that the UE does not move even in the next RRC connected state, the UE may gradually increase the measurement period of a neighbor cell.

In this case, information for changing the neighbor cell measurement may be received through the system information.

Meanwhile, the observation interval may be determined by operating a timer, for example. Also, if a change in the signal strength or quality exceeds a threshold value of a change amount even when the observation interval has not expired, the UE may measure a neighbor cell depending on whether the signal strength or quality value fulfills the criteria condition, and may set a new observation interval. Alternatively, before the observation interval expires, the UE may determine that there is no mobility, and may not perform the neighbor cell measurement. After the observation interval has expired, the UE may measure a neighbor cell depending on whether the signal strength or quality value fulfills the criteria condition.

Meanwhile, the first and second methods may be used for determining the UE mobility when the signal strength does not fulfill the criteria condition. That is, when the strength of a signal fulfills the criteria condition, the determination of the UE mobility may be omitted.

However, embodiments of the present invention are not limited to this. Regardless of whether the signal strength fulfills the criteria condition, the UE may determine the UE mobility by using the first method or the second method.
<Third Method>

In addition, when a signal strength or quality value (RSRP or RSRQ) measured after the signal strength or quality fulfills the criteria condition fulfills the criteria condition for a specific time or a specific number of times, the UE may determine that there is no mobility.

The UE may drive a timer to check whether the strength or quality of signals received for the specific time fulfills the criteria condition. The UE may check whether the received signal strength or quality continuously fulfills the criteria condition for the specific time or the specific number of times for the specific time.

Information related to a timer value may be received through the system information or the RRC message as described above.

Also, in order to check whether the criteria condition is fulfilled the specific number of times, the UE may receive information about the specific number of times through the system information or the RRC message.

Therefore, if it is determined that the UE has no mobility, the UE may not measure a neighbor cell. The details are the same as described above, and thus will be omitted in the following.
<Fourth Method>

In addition, the UE may check a coverage level of the UE according to the strength or quality of a received signal. If the received signal strength or quality value (RSRP or RSRQ) of the UE is maintained for a certain time at the corresponding coverage level, the UE may determine that there is no mobility.

The UE may classify coverage levels according to the range of the received signal strength or quality value. In this case, information about the range for classifying the levels may be set in the UE by the base station (or referred to as eNB) through the system information or the RRC message. Alternatively, this information may be previously set and stored in the UE and the base station.

For example, the coverage level may be determined at intervals of 20 dB such as a coverage level 1 in case of signal strength between 0 dB and −20 dB and a coverage level 2 in case of signal strength between −20 dB and −40 dB.

Alternatively, based on the signal strength measured by the UE, it may be determined that the signal strength smaller than 142 dB belongs to a normal coverage or coverage level 0, the signal strength between 142 dB and 152 dB belongs to a coverage level 1, and the signal strength between 152 dB and 162 dB belongs to a coverage level 2.

In this case, the signal strength may also include a path loss or coupling loss value. This may be applied wholly to the present invention as well as this embodiment.

However, the interval of coverage levels may be varied and may be set irregularly. Also, the maximum and minimum values of signal strength for determining the coverage levels may be varied according to setting of the base station.

Therefore, the UE may identify the coverage level by determining the range in which the received signal strength or quality is contained. If the signal strength is maintained at the coverage level for a specific time, the UE may determine that there is no mobility. Information about the specific time may be set using the system information or the RRC message.

Therefore, if it is determined that the UE has no mobility, the UE may not measure a neighbor cell. The details are the same as described above, and thus will be omitted in the following.
<Fifth Method>

In addition, if the signal strength of a serving cell is changed more than a certain level from the previous signal and then the signal strength or quality value (RSRP or RSRQ) of the serving cell is not changed more than a certain level for a specific time or a specific number of times, the UE may determine that there is no mobility.

In this case, through the system information or the RRC message, the UE may receive at least one of information for determining whether the signal strength is changed more than a certain level, and information about a specific time or a specific number of times.

Therefore, if it is determined that the UE has no mobility, the UE may not measure a neighbor cell. The details are the same as described above, and thus will be omitted in the following.

<Sixth Method>

In addition, if the signal strength or quality of a serving cell enters a predefined stage and then the signal strength or quality value (RSRP or RSRQ) of the serving cell is not changed more than a certain level for a specific time or a specific number of times, the UE may determine that there is no mobility. Alternatively, if the signal strength or quality of the serving cell enters the predefined stage and then the signal strength or quality value (RSRP or RSRQ) of the serving cell is not out of the predefined stage for the specific time or the specific number of times, the UE may determine that there is no mobility.

In this case, the predefined stage may be determined as a range of the signal strength, and the UE may receive, the system information or the RRC message, at least one of information about a predefined signal strength range, information about the specific time or the specific number of times, or information for determining whether there is a change more than a certain level.

Therefore, if it is determined that the UE has no mobility, the UE may not measure a neighbor cell. The details are the same as described above, and thus will be omitted in the following.

Meanwhile, embodiments of the present invention are not limited to this, and the UE may determine the mobility by various methods according to setting of the user or system.

The UE may use a method for determining the mobility through a sensor or the like equipped therein. For example, when a distance variation measured by a distance sensor for a certain time or a velocity value measured by a velocity sensor is smaller than a predetermined value, the UE may determine that there is no mobility.

In addition, the UE may check the UE mobility by using device's presetting or a UE subscription service.

Specifically, after a received signal fulfills the criteria condition, the TIE may perform a cell reselection operation according to presetting of the system or device.

Alternatively, after entering a specific coverage level, the UE may perform the cell reselection operation according to presetting of the system or device.

Alternatively, after the signal strength or quality is changed more than a certain level from a previous level, the UE may perform the cell reselection operation according to presetting of the system or device.

Alternatively, after the signal strength or quality enters a predefined stage, the UE may perform the cell reselection operation according to presetting of the system or device.

In this case, if it is determined that there is no mobility, the UE may use a method for not measuring a neighboring cell, increasing a measurement period, performing measurement during a timer value, or gradually increasing the measurement period as described above. The details are the same as described above.

Figure 5:
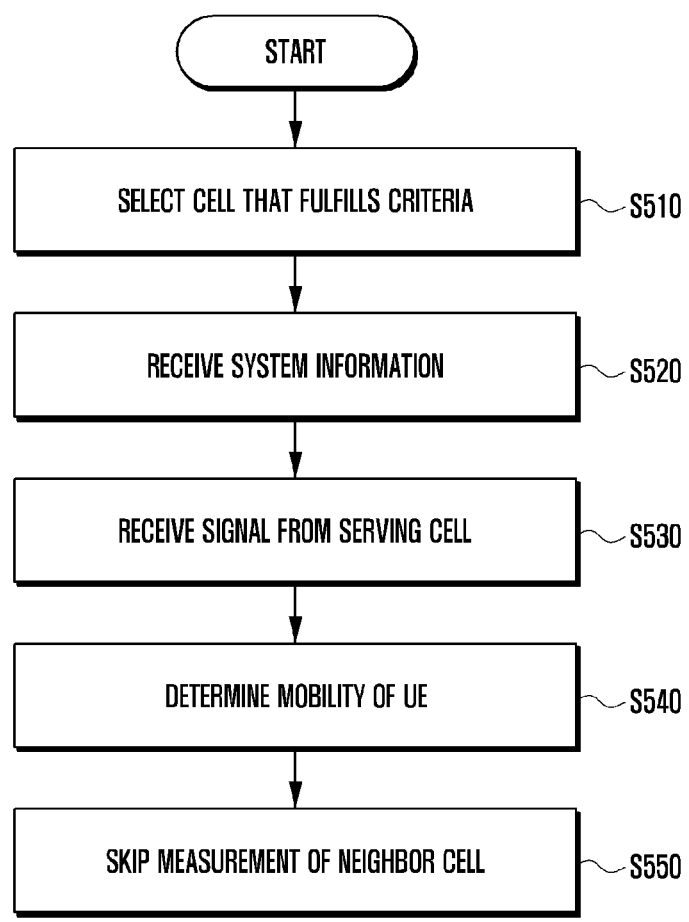
FIG. 5 is a diagram illustrating an operation of a terminal according to an embodiment of the present invention.

FIG. 5 is a diagram illustrating an operation of a terminal according to an embodiment of the present invention.

Referring to FIG. 5, at step S510, the terminal (i.e., UE) may select a cell that fulfills a criteria condition.

Then, at step S520, the UE may receive system information. The details of information included in the system information are the same as described above, and thus will be omitted in the following description.

Then, at step S530, the UE may receive a signal from a serving cell. At this time, the signal received by the UE may be a synchronous signal or a reference signal as described above. When a DRX timer has expired, the UE may receive a signal from the serving cell.

Then, at step S540, the UE may determine the mobility thereof. A detailed method for determining the UE mobility is the same as described above, and will not be described below.

The UE may determine the UE mobility by using the strength or quality of the received signal. At this time, depending on a method for determining the mobility, the UE may determine whether the signal strength fulfills the criteria condition. For example, in case of using the third method, the UE may determine in advance whether the signal strength fulfills the criteria condition.

If it is determined that there is no mobility, in order to determine whether to measure a neighbor cell, the UE may check whether the signal strength of the UE fulfills the criteria condition. The details are the same as described above, and thus will be omitted in the following.

If it is determined that there is no mobility, the UE may skip measurement of a neighbor cell at step S550.

As described above, the UE may not measure the neighbor cell for a preset timer period. Alternatively, the UE may not measure the neighbor cell once or a predetermined number of times. Alternatively, the UE may increase a period of measuring the neighbor cell. Alternatively, the UE may gradually increase the measurement period for the neighbor cell. The details are the same as described above, and thus will be omitted in the following.

Figure 6:
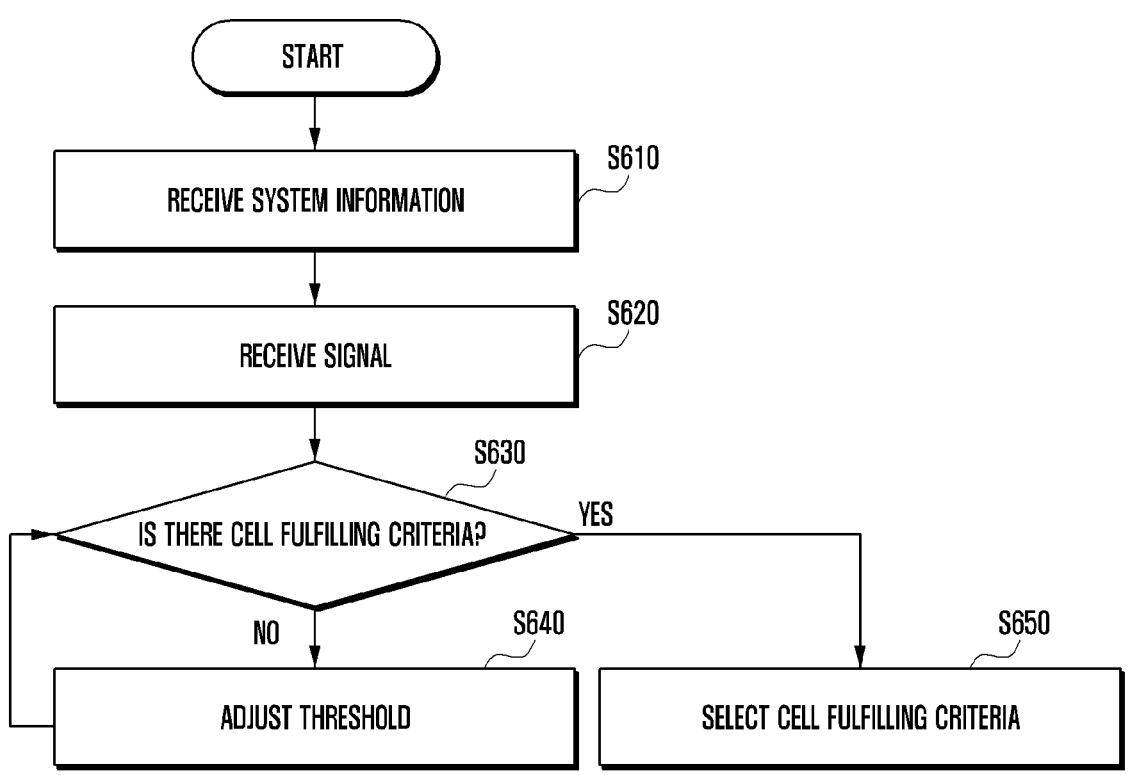
FIG. 6 is a diagram illustrating a method for improving cell coverage according to another embodiment of the present invention.

FIG. 6 is a diagram illustrating a method for improving cell coverage according to another embodiment of the present invention.

Described in this embodiment is a method for selecting a cell by adjusting a threshold value.

At step S610, the UE may receive system information. The system information may include MIB and SIB. In addition, the system information may include information for a cell selection or information for a cell reselection.

The information for a cell selection or the information for a cell reselection may include information about a threshold value to be used for determining whether the criteria condition is fulfilled. Also, an offset value for adjusting the threshold value when the criteria condition is not fulfilled may be included.

Alternatively, the threshold value may be determined in advance according to each coverage level. Alternatively, the offset value may be determined in advance according to each coverage level.

In addition, the above information may be included in the RRC message.

At step S620, the UE may receive signals from neighbor cells. At this time, these signals may include synchronization signals or reference signals. The details are the same as described above.

Then, at step S630, the UE may check whether there is a cell that fulfills the criteria condition.

That is, the UE may check whether the strength or quality of the received signal exceeds a threshold value.

If there is no cell that fulfills the criteria condition, the UE may adjust the threshold value at step S640.

The above process may be applied to both the initial selection of a cell and the reselection of a cell.

Various methods may be used to adjust the threshold value.

As described above, the UE may receive the threshold value and the offset value, and may adjust the threshold value by applying the offset value to the threshold value. The UE may adjust the threshold value by subtracting the offset value from the existing threshold value.

Alternatively, the UE may receive a plurality of threshold values, and may sequentially apply the threshold values.

The details of adjusting the threshold value will be described later.

Then, at step S630, the UE may check whether there is a cell that fulfills the criteria condition.

Thus, the UE may sequentially change the threshold value until a cell that fulfills the criteria condition is found.

Therefore, when a cell that fulfills the criteria condition is found, the UE may select the cell fulfilling the criteria condition at step S650.

Meanwhile, if the UE does not find a cell fulfilling the criteria condition even if adjusting the threshold value a certain number of times, the UE may perform a search for a cell fulfilling the criteria condition after a backoff timer.

Figure 7:
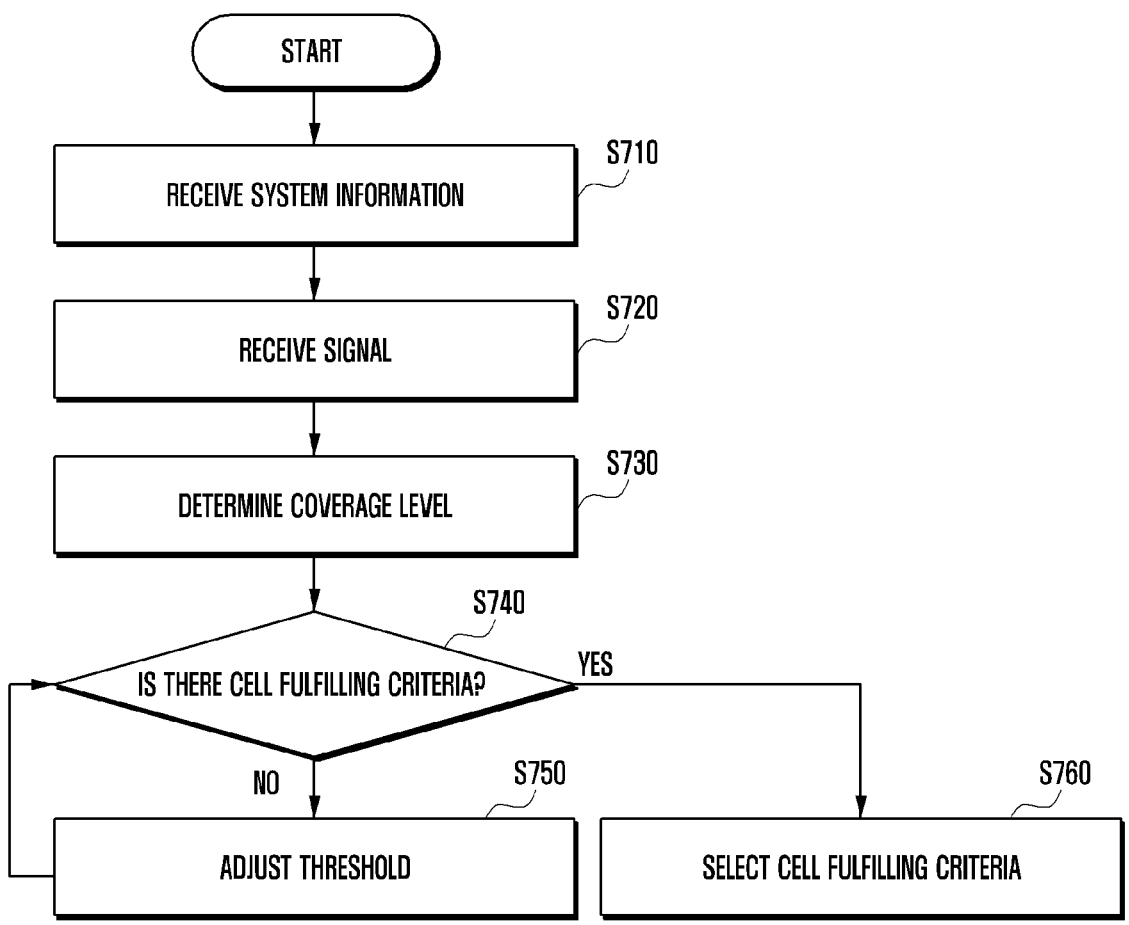
FIG. 7 is a diagram illustrating another method for improving cell coverage according to another embodiment of the present invention.

FIG. 7 is a diagram illustrating another method for improving cell coverage according to another embodiment of the present invention.

Described in this embodiment is a method for selecting a cell by setting a plurality of threshold values for each coverage level.

At step S710, the UE may receive system information. The system information may include MIB and SIB. In addition, the system information may include information for a cell selection or information for a cell reselection. The details are the same as described above.

Then, at step S720, the UE may receive signals from neighbor cells. At this time, these signals may include synchronization signals or reference signals. The details are the same as described above.

Then, at step S730, the UE may determine the coverage level. The coverage level is the same as described above, and thus will be omitted below.

At this time, a threshold value for determining the criteria condition may be determined in advance according to the coverage level, and the UE may identify the threshold value according to the coverage level. Alternatively, only one reference threshold value may be set, and an offset value may be set according to the coverage level. Therefore, the UE may determine the threshold value by adding or subtracting the offset value from the reference threshold value according to the coverage level.

Alternatively, only one threshold value and only one offset value may be set, and the UE may determine the threshold value of the coverage level by subtracting or adding the offset value once according to the corresponding coverage level.

Therefore, at step S740, the UE may check whether there is a cell that fulfills the criteria condition.

That is, the UE may check whether there is a cell for which the strength or quality of the received signal exceeds the threshold value.

If there is no cell that fulfills the criteria condition, the UE may adjust the threshold value at step S750.

The UE may adjust the threshold value while increasing or decreasing the coverage level. If the threshold values are set according to the number of coverage levels, the UE may search for a cell fulfilling the criteria condition by using the threshold value corresponding to the coverage level.

Alternatively, if the offset values are set according to the number of coverage levels, the UE may search for a cell fulfilling the criteria condition by applying a value corresponding to the coverage level to the threshold value.

Alternatively, if only one threshold value and only one offset value are set, the UE may search for a cell fulfilling the criteria condition by applying the offset value to the threshold value while increasing or decreasing the coverage level.

The details of adjusting the threshold value will be described later.

Then, at step S740, the UE may check whether there is a cell that fulfills the criteria condition.

Thus, the UE may sequentially change the threshold value until a cell that fulfills the criteria condition is found.

Therefore, when a cell that fulfills the criteria condition is found, the UE may select the cell fulfilling the criteria condition at step S760.

Meanwhile, if the UE does not find a cell fulfilling the criteria condition even if adjusting the threshold value a certain number of times, the UE may perform a search for a cell fulfilling the criteria condition after a backoff timer.

In this case, there may be various methods for adjusting the threshold value as described above, and the details will be described below.

Figure 8:
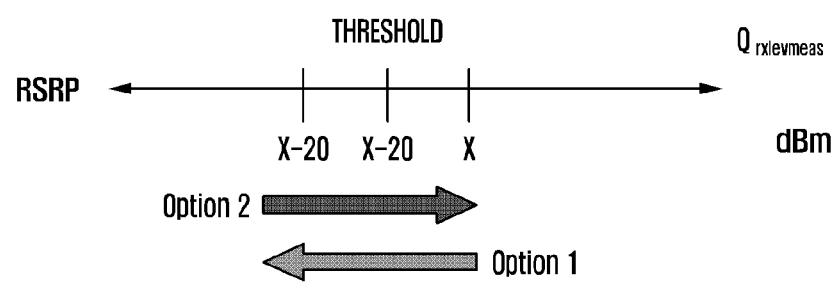
FIG. 8 is a diagram illustrating a detailed method for adjusting a threshold value according to another embodiment of the present invention.

FIG. 8 is a diagram illustrating a detailed method for adjusting a threshold value according to another embodiment of the present invention.

In the present invention, the threshold value may be represented by $S_{IntrasearchP}$ or $S_{IntraSearchQ}$ or $S_{nonIntraSearchP}$ or $S_{nonIntraSearchQ}$ or $Q_{rxlevmin}$ or $Q_{qualmin}$ or $Q_{rxlevminoffset}$ or $Q_{qualminoffset}$.

As described above, the threshold value may be set as a value of each stage based on the coverage level, or set with a predetermined offset value.

In addition, a predefined resource allocation value (MCS decision value, repetition decision value, other resource allocation index decision value) and a pre-mapped serving cell signal strength value or a serving cell signal attenuation value may be set as the values of each stage (e.g., coverage class, coverage level, coverage enhancement level, etc. among 3GPP cellular Internet of Things technologies), or set with a certain plus or minus margin or offset value.

Referring to FIG. 8, the UE may search for a cell fulfilling the criteria condition by using an existing threshold value, and if the cell that fulfills the criteria condition does not exist, the UE may reduce the threshold value of a cell by the offset value (Option 1).

Alternatively, in case of using the coverage level of the UE, the UE may use the threshold value corresponding to the coverage level while increasing the coverage level of the UE. At this time, as the coverage level increases, the threshold value may decrease. However, it may be set such that the threshold value increases as the coverage level decreases. In this case, the UE may use the threshold value corresponding to the coverage level while reducing the coverage level of the UE (Option 1).

Thus, using the above-described method, the UE may identify a cell that fulfils the criteria condition.

Alternatively, the UE may set an intermediate value among the set threshold values, and select a cell having the strongest signal among found cells. Also, the UE may use, as a threshold value for the criteria condition, the closest threshold value based on the selected cell (Option 2).

Figure 9:
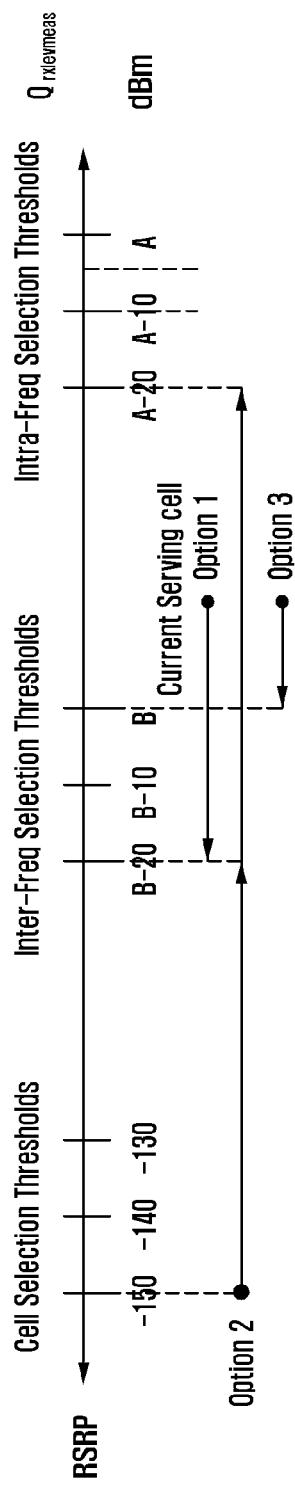
FIG. 9 is a diagram illustrating another method for setting a threshold value for a cell reselection according to another embodiment of the present invention.

FIG. 9 is a diagram illustrating another method for setting a threshold value for a cell reselection according to another embodiment of the present invention.

Referring to FIG. 9, the threshold value or offset value may be set based on the signal strength of a current serving cell (e.g., the coverage level or the signal strength or quality). At this time, the threshold value or the offset value may refer to $S_{intrasearchIP}$ or $S_{IntrasearchQ}$ or $S_{nonIntraSearchP}$ or $S_{nonIntraSearchQ}$ or $Q_{rxlevmm}$ or $Q_{qualmin}$ or $Q_{rxlevminoffset}$ or $Q_{qualmmoffset}$ or an offset value of each of the above values.

Then, the UE may use, as a threshold for cell reselection, the threshold value or offset value set based on the signal strength of the serving cell. In this case, if a cell having better signal strength is found, the UE may change a threshold value for determining a criteria condition to a threshold value of the found cell (Option 1).

Alternatively, the UE may perform a cell reselection by using the coverage level offset or threshold value selected in the initial cell selection (Option 2).

Alternatively, the UE may perform the cell reselection operation, based on the highest threshold value. In this case, the highest threshold value may refer to the maximum value among $S_{IntraSearchP}$ or $S_{IntraSearchQ}$ or $S_{nonIntraSearchP}$ or $S_{nonIntraSearchQ}$ or $Q_{rxlevmin}$ or $Q_{qualmin}$ or $Q_{rxlevminoffset}$ or $Q_{qualminoffset}$ or an offset value of each of the above values (Option 3).

Alternatively, the UE may perform the cell reselection operation, based on the lowest threshold value. In this case, the lowest threshold value may refer to the minimum value among $S_{IntraSearchP}$ or $S_{IntraSearchQ}$ Or $S_{nonIntraSearchP}$ or $S_{nonIntraSearchQ}$ or $Q_{rxlevmin}$ or $Q_{qualmin}$ Or $Q_{rxlevminoffset}$ or $Q_{qualminoffset}$ or an offset value of each of the above values (Option 4).

Meanwhile, in order to manage a neighbor cell list, the UE may keep the best coverage level and the optimal cell for each frequency and, if a cell reselection condition is fulfilled, quickly reselect a cell at the corresponding frequency. A detailed operation is as follows.

In case of RRC connection release, a base station (or referred to as eNB) may notify corresponding frequency information to the UE through redirection information. In addition, the base station may notify corresponding frequency preference information to the UE through SI 1, 2, 3, . . . or any other dedicated signaling.

The UE may report a specific frequency preference to the base station through an arbitrary uplink signal (PUSCH, PUCCH, PRACH, . . . ), and the base station that receives such a signal may inform a cell selection possibility (or whether to allow cell selection) through an arbitrary downlink signal (PDCCH, SI 1, 2, 3, . . . , PDSCH).

In addition, as described above, the base station may transmit information about threshold values of respective stages of the criteria condition ($S_{IntraSearchP}$ or $S_{IntraSearchQ}$ or $S_{nonIntraSearchP}$ or $S_{nonIntraSearchQ}$ or $Q_{rxlevmin}$ or $Q_{qualmin}$ or $Q_{rxlevminoffset}$ or $Q_{qualminoffset}$ or an offset value of each of the above values), a threshold based offset value, a timer value for performing no neighbor cell measurement, and a neighbor cell measurement period to the UE through the system information.

In addition, the base station may add an information field for indicating each SI update to the MI such that the UE that receives the above field of the MI can selectively receive the SI.

The SI update information may be an SI value tag consisting of certain bits (increased by 1 whenever updated).

The SI update information exists in SI 1 and indicates update information for SI 2 and subsequent SIs.

Figure 10:
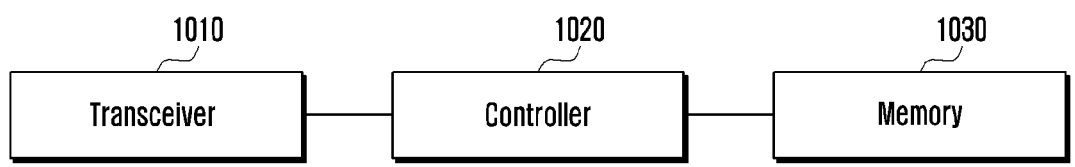
FIG. 10 is a diagram illustrating a structure of a terminal according to the present invention.

FIG. 10 is a diagram illustrating a structure of a terminal according to the present invention.

Referring to FIG. 10, the terminal may include a transceiver 1010, a controller 1020, and a storage 1030.

The transceiver 1010 may transmit and receive signals with other network entities. The transceiver 1010 may receive system information from, for example, a base station and receive a synchronization signal or a reference signal.

The controller 1020 may control the operation of the terminal proposed in the present invention.

The controller 1020 may select a cell that fulfills a criteria condition. At this time, the controller 1020 may store a value measured in the selected cell. The controller 1020 may store such measured values and use them in determining whether to measure a neighbor cell.

The controller 1020 may receive system information. The system information may include MIB and SIB.

The system information may include information for a cell selection or information for a cell reselection. The information for a cell selection or the information for a cell reselection may include information about at least one of a timer value (Tpause), a signal strength change threshold (ChangeThreshold-rxlev), and an observation interval (Tobservation). The details are the same as described above.

When a DRX timer expires, the controller 1020 may receive a signal from a serving cell. This signal received by the terminal may include at least one of a synchronization signal and a reference signal as described above. Therefore, the terminal may determine the strength and quality of a cell signal by measuring the signal received from the serving cell.

The controller 1020 may determine the mobility of the terminal. A detailed method for determining the terminal mobility is the same as described above, and thus will not be described below.

If it is determined that the terminal moves, the controller 1020 may determine whether the strength of the received signal fulfills the criteria condition. If not fulfilled, the controller may measure a neighbor cell and thereby perform a cell reselection.

If it is determined that the terminal does not move (or that the terminal is stationary), the controller 1020 may omit the measurement of a neighbor cell. Even when the received signal strength fails to fulfill the criteria condition, the controller 1020 may omit the neighbor cell measurement. The controller 1020 may omit the neighbor cell measurement once or a certain number of times. In addition, the controller 1020 may omit the neighbor cell measurement operation for a predetermined timer or increase the period of the neighbor cell measurement. In addition, the controller 1020 may gradually increase the neighbor cell measurement period of the terminal.

Meanwhile, the controller may identify a cell fulfilling the criteria condition by changing the threshold value for determining the criteria condition.

The received system information may include information for a cell selection or information for a cell reselection. The information for a cell selection or the information for a cell reselection may include information about a threshold value to be used for determining whether the criteria condition is fulfilled. Also, an offset value for adjusting the threshold value when the criteria condition is not fulfilled may be included.

Alternatively, the threshold value may be determined according to each coverage level. Alternatively, the offset value may be determined according to each coverage level.

The controller 1020 may receive signals from neighbor cells and check whether there is a cell that fulfills the criteria condition. That is, the controller 1020 may check whether there is a cell for which the strength or quality of the received signal exceeds the threshold value.

If there is no cell that fulfills the criteria condition, the controller 1020 may adjust the threshold value.

Various methods may be used to adjust the threshold value, and the details are the same as described above.

In addition, using the adjusted threshold value, the controller 1020 may check whether there is a cell that fulfills the criteria condition.

Like this, the controller 1020 may sequentially change the threshold value until a cell that fulfills the criteria condition is found.

Therefore, when a cell that fulfills the criteria condition is found, the controller 1020 may select the found cell.

Meanwhile, if a cell that fulfills the criteria condition is not found even though the threshold value is adjusted a certain number of times, the controller 1020 may perform again an operation of searching for a cell fulfilling the criteria condition after a backoff timer.

In addition, the controller 1020 may control all operations of the terminal proposed by the present invention.

The storage 1030 may store information received from the base station or information generated by the terminal. For example, the storage 1030 may store a result of measuring a signal received from a cell. In addition, the storage 1030 may store information included in the system information or the RRC message received from the base station. In addition, the storage 1030 may store all kinds of information received, generated, and transmitted by the terminal in the present invention.

While the present disclosure has been particularly shown and described with reference to exemplary embodiments thereof, it is clearly understood that the same is by way of illustration and example only and is not to be taken in conjunction with the present disclosure. It will be understood by those skilled in the art that various changes in form and details may be made therein without departing from the subject matter and scope of the present disclosure.

The invention claimed is:

1. A method of a terminal in a wireless communication system, the method comprising:
   receiving system information including a threshold value and a timer value;
   receiving a signal from a serving cell when a discontinuous reception (DRX) timer expires;
   determining mobility of the terminal based on a result of measuring the signal and the threshold value;
   identifying a duration to skip a neighbor cell measurement using the timer value included in the system information, when it is determined that the terminal has no mobility; and
   skipping the neighbor cell measurement for the duration,
   wherein the result of measuring the signal includes at least one of a strength value or quality value of the signal.

2. The method of claim 1, wherein receiving the system information including a change threshold value,
   wherein determining mobility of the terminal comprises:
   determining whether a difference between the result of measuring the signal and a previously measured result is smaller than
   change threshold value,
   wherein the change threshold value includes at least one of a signal strength change threshold value or a signal quality change threshold value.

3. The method of claim 2, wherein determining mobility of the terminal comprises:
   determining that the terminal has no mobility based on the difference between the result of measuring the signal and the previously measured result being smaller than the change threshold value.

4. The method of claim 2, wherein determining mobility of the terminal comprises:
   determining whether a difference between a result of measuring the signal received for a predetermined time and the previously measured result is smaller than the change threshold value.

5. The method of claim 1, wherein skipping the neighbor cell measurement comprises:
   performing no measurement of the neighbor cell during the timer value or increasing a measurement period for the neighbor cell.

6. The method of claim 1, wherein determining mobility of the terminal comprises:
   determining whether the result of measuring the signal exceeds the threshold value; and
   determining that the terminal has no mobility based on the result of the signal exceeding the threshold value for a predetermined time or a predetermined number of times.

7. A terminal in a wireless communication system, the terminal comprising:
   a transceiver; and
   a controller configured to:
   receive system information including a threshold value and a timer value,
   receive a signal from a serving cell when a discontinuous reception (DRX) timer expires,
   determine mobility of the terminal based a result of measuring the signal and the threshold value,
   identify a duration to skip a neighbor cell measurement using the timer value included in the system information, when it is determined that the terminal has no mobility; and
   skip the neighbor cell measurement for the duration,
   wherein the threshold value includes at least one of a signal strength change threshold value or a signal quality change threshold value.

8. The terminal of claim 7, wherein the controller is further configured to:
   receive the system information including a change threshold value,
   determine whether a difference between the result of measuring the signal and a previously measured result is smaller than
   the change threshold value,
   wherein the change threshold value includes at least one of the signal strength change threshold value or the signal quality change threshold value.

9. The terminal of claim 8, wherein the controller is further configured to:
   determine that the terminal has no mobility based on the difference between the result of measuring the signal and the previously result measured value is being smaller than the change threshold value.

10. The terminal of claim 8, wherein the controller is further configured to determine whether a difference between a result of measuring the signal received for a predetermined time and a previously measured result being smaller than the change threshold value.

11. The terminal of claim 8, wherein the controller is further configured to:

determine whether the result of measuring the signal exceeds the threshold value, and determine that the terminal has no mobility based on the result of the signal exceeding the threshold value for a predetermined time or a predetermined number of times.

12. The terminal of claim 7, wherein the controller is further configured to perform no measurement of the neighbor cell during a predetermined timer value or to increase a measurement period for the neighbor cell.

* * * * *